United States Patent Office 3,470,480

Patented Sept. 30, 1969

3,470,480

DIGITAL COUNTER CONTROLLED AUTOMATIC GAIN REGULATOR EMPLOYING PILOT SIGNAL

Kenneth J. Smart, Strathfield, New South Wales, and Peter J. Thomson, Kingsford, New South Wales, Australia, assignors to International Standard Electric Corporation, New York, N.Y., a corporation of Delaware Filed Dec. 27, 1966, Ser. No. 604,719
Claims priority, application Australia, Dec. 29, 1965, 68,395/65
Int. Cl. H04b *1/16*
U.S. Cl. 325—400 9 Claims

ABSTRACT OF THE DISCLOSURE

Uses the well-known principle of measuring received pilot level and by negative feedback adjusting the gain of a regulating amplifier to keep the pilot level constant. Differs from the prior art in that the feedback includes analogue to digital conversion and control is applied through a counter. The counter can operate at only one speed apart from zero and this means that short duration transients have less effect than in a conventional system. Complete failure of the pilot is arranged to lock the counter at its last automatically set position.

Figure 1:
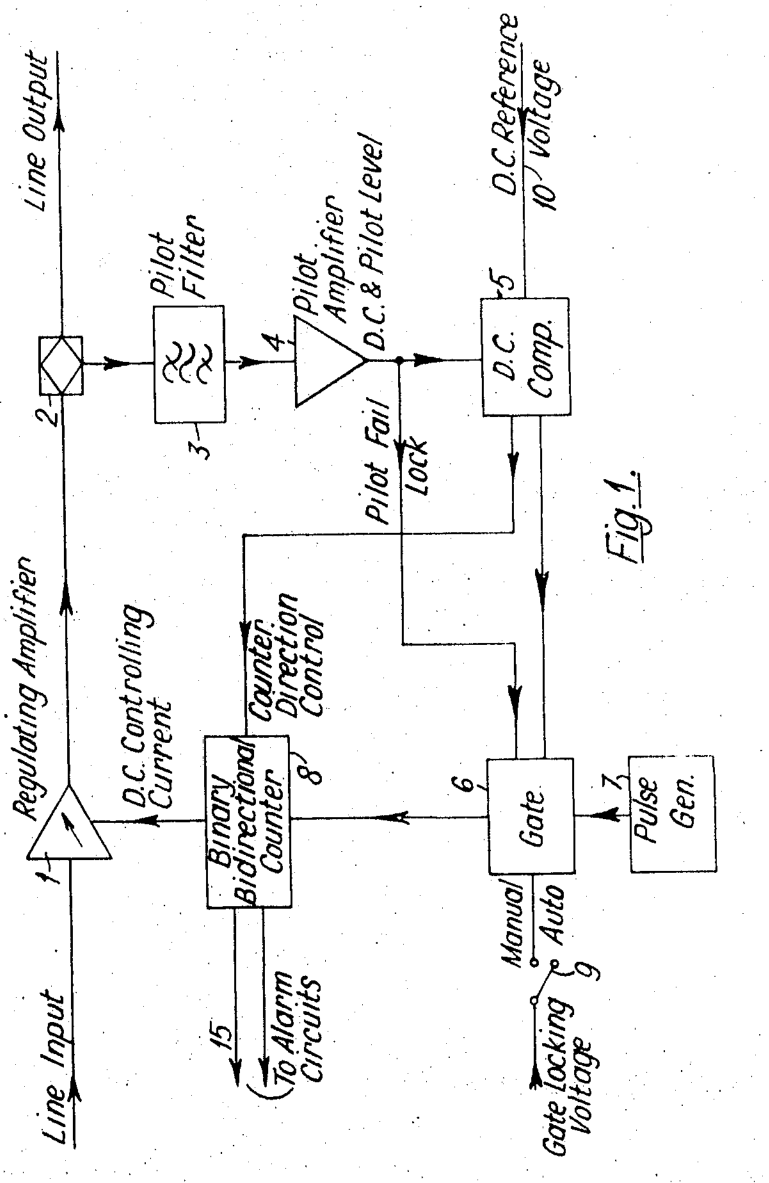

This invention relates to automatic gain regulators (A.G.R.'s) for use in telecommunication systems.

In the more complex types of telecommunication systems many factors work towards variation in the overall gain. Valves, transistors, etc., are subject to ageing variations and also random changes in their characteristics. With open wire lines there is the added difficulty that certain weather conditions accentuate the leakage between conductors. It thus becomes desirable to provide special means to keep the overall gain constant, or nearly so.

It is well known to transmit along with the intelligence a pilot signal. At the receiving stations this pilot signal is measured and a signal representative of the difference between its amplitude and a reference level is used to control the gain of one of the amplifiers in the system. In this way variations in gain are considerably reduced. Various practical difficulties arise. If, for example, there is a complete failure in the generation of the pilot signal the overall gain will be automatically made too high. Thus there is advantage in using a signal derived from total failure of the pilot to over-ride the existing A.G.R. By this means the gain might be restored to a standard level while the pilot is absent or alternatively it might be kept at the last automatically adjusted level. Motor driven attenuators have been used for this task, but have considerable bulk and frequently require special power supplies.

These prior art automatic gain regulators use analogue techniques. It has now been found that certain advantages flow from using digital techniques rather than analogue techniques, and the present invention provides an automatic gain regulator using digital techniques.

According to the principal aspect of the present invention an A.G.R. for a telecommunication system comprises means for generating a pilot signal which is transmitted along with the intelligence, a comparator for comparing the amplitude of the pilot signal as received at a terminal with a reference level whereby to provide a difference signal which is used to drive a digital counter, and means for using the counter setting to control the gain of a regulating amplifier within the system, the counter being driven in such a direction as to reduce the variations in overall gain.

As mentioned above certain advantages flow from using these digital techniques rather than the more common analogue techniques. Certain counter settings may be arranged to trigger alarms to indicate that the automatic gain adjustment has reached limits. Also the counter provides a direct indication of the amount of gain compensation in use at any time. It is convenient to have the counter capable of operating at one speed only. This means that the rate of correction after a disturbance is independent of the size of the disturbance. An improved transient response also occurs.

In practical embodiments it is convenient to use thermistors in the variable gain amplifiers. The resistance of the thermistor is varied by varying the current flow through its heater. A disadvantage of thermistors is that they are, of course, sensitive to the ambient temperature, and are also subject to quite large random changes in characteristics. Hence, variations in ambient temperature subsequent to a failure of pilot would cause undesirable changes in system gain. A further aspect of this invention provides a means for nullifying these undesirable changes.

According to this further aspect of this invention the counter output referred to above is compared with a voltage which is proportional to the thermistor resistance and the resulting difference signal is caused to control the thermistor heater current.

Reference will now be made to the accompanying drawings in which

Figure 2:
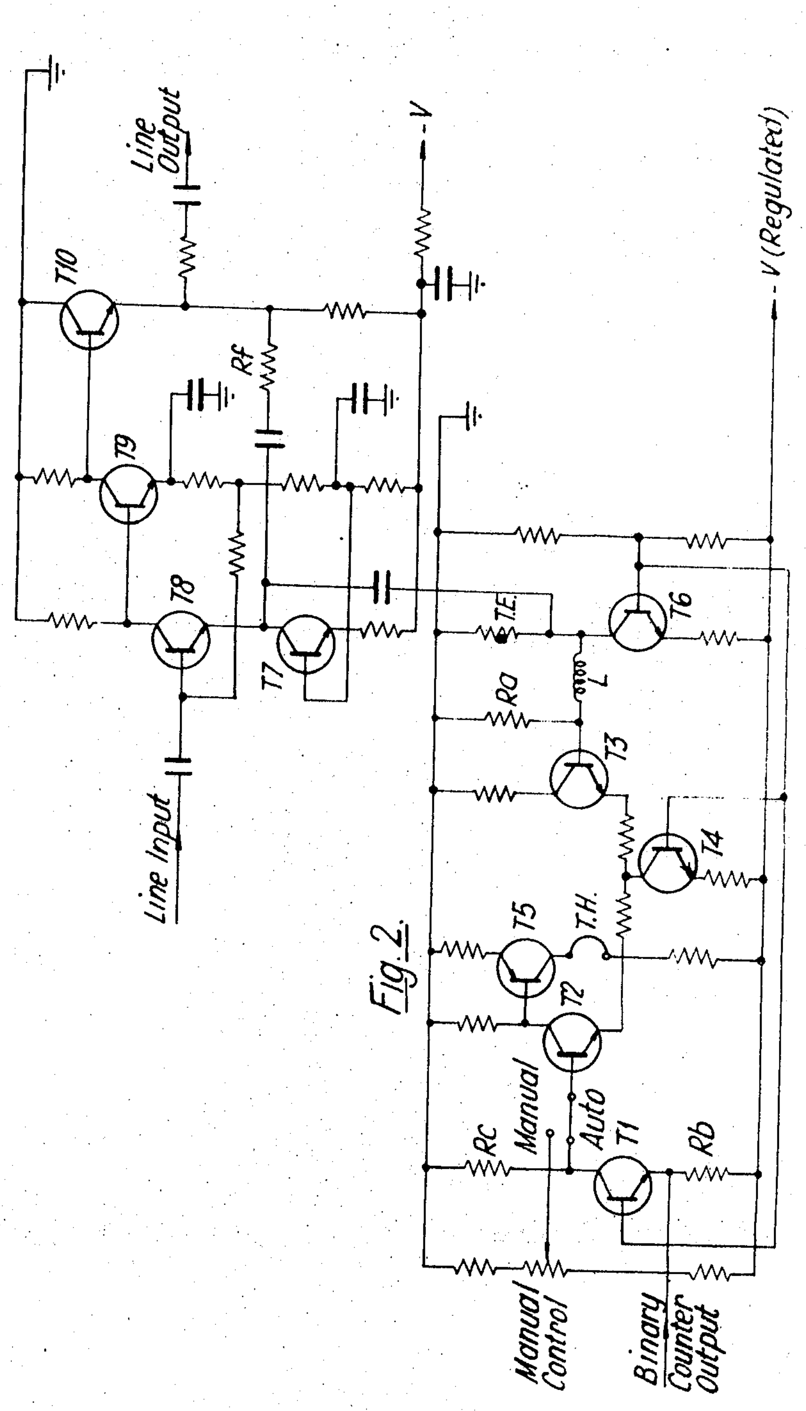
Figure 3:
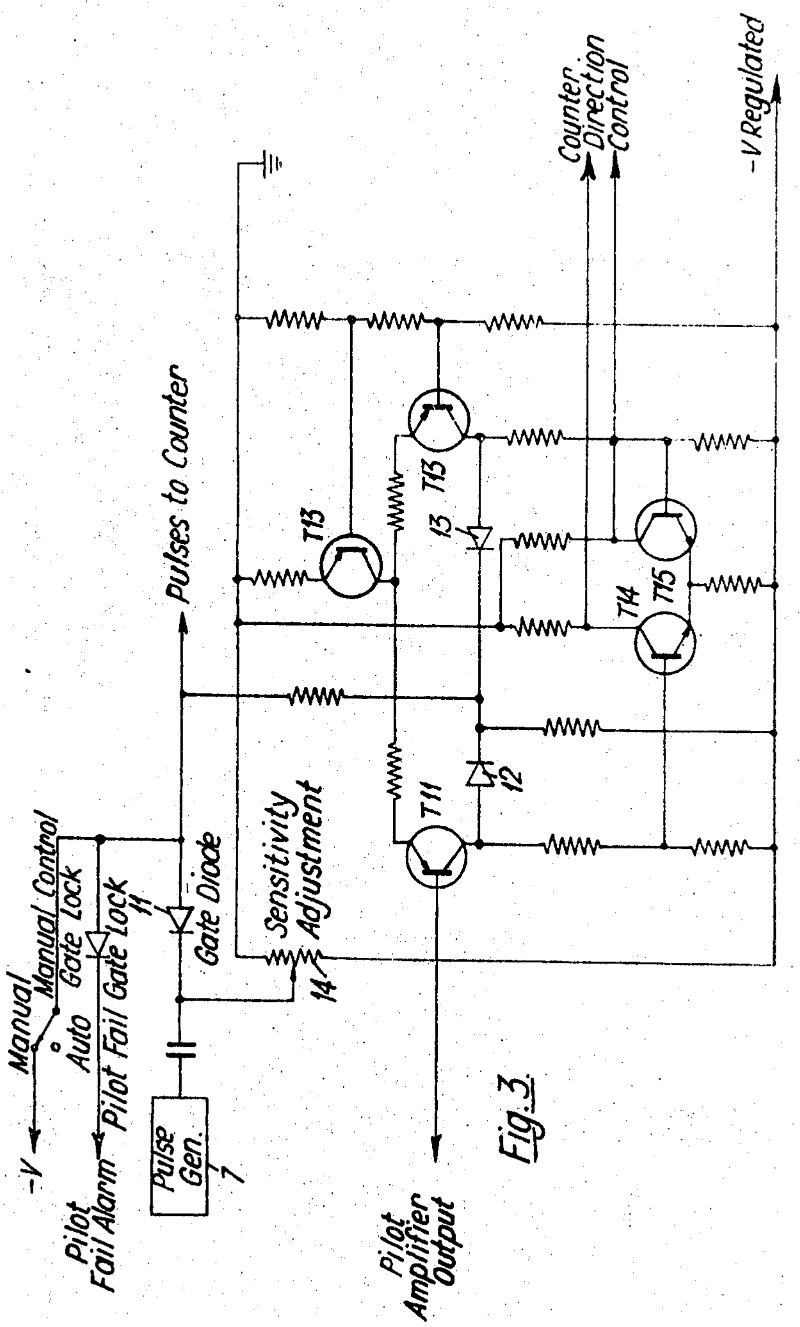
Figure 4:
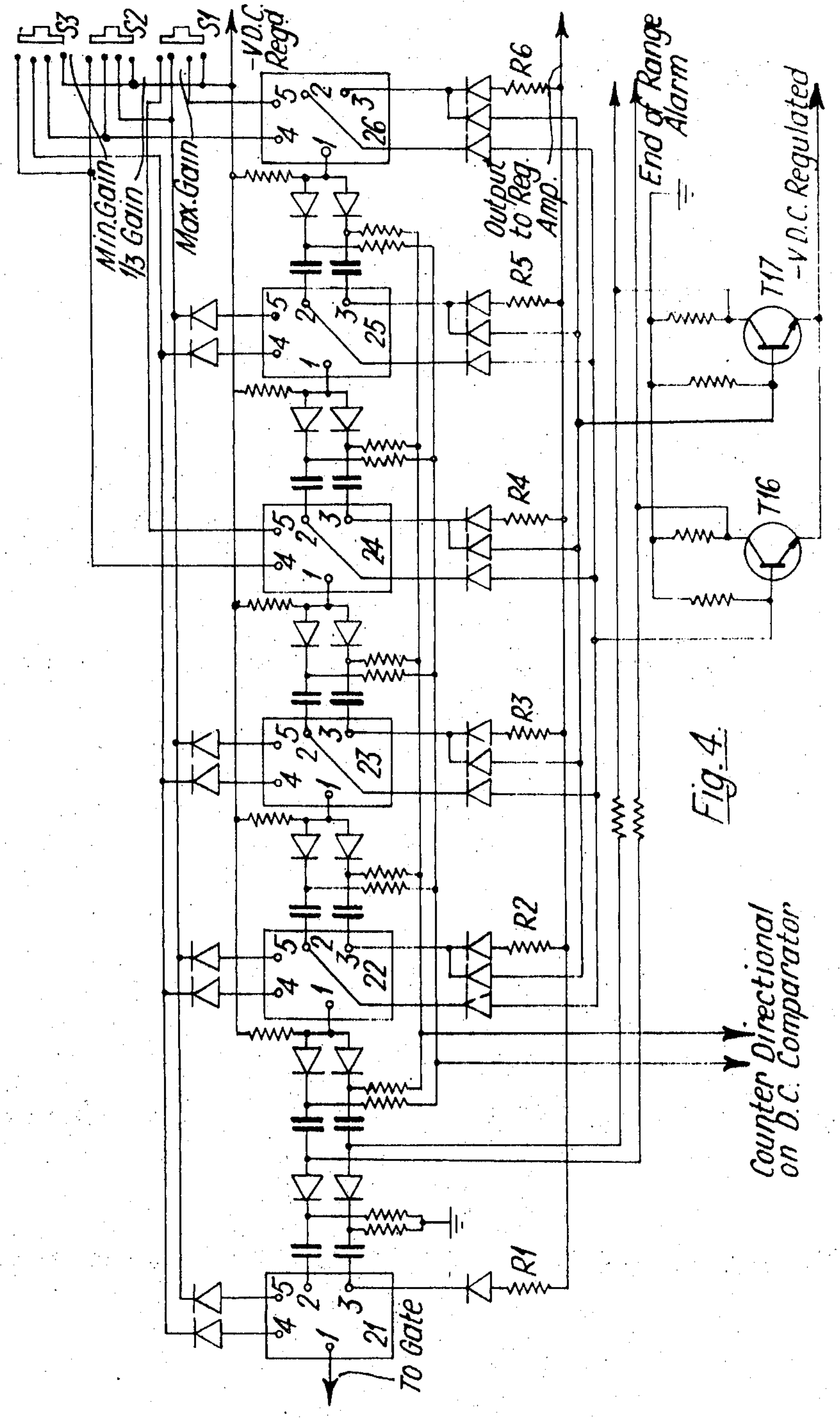
Figure 5:
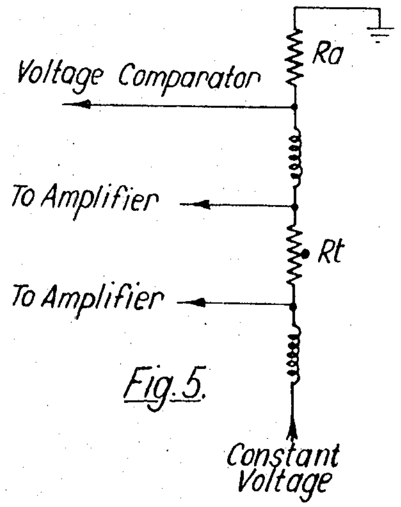
Figure 6:
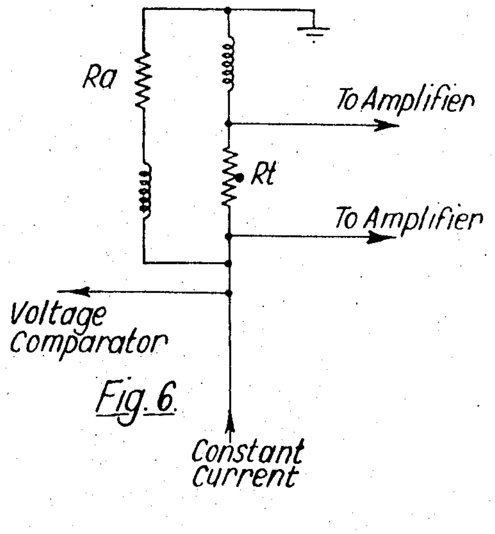
Figure 7:
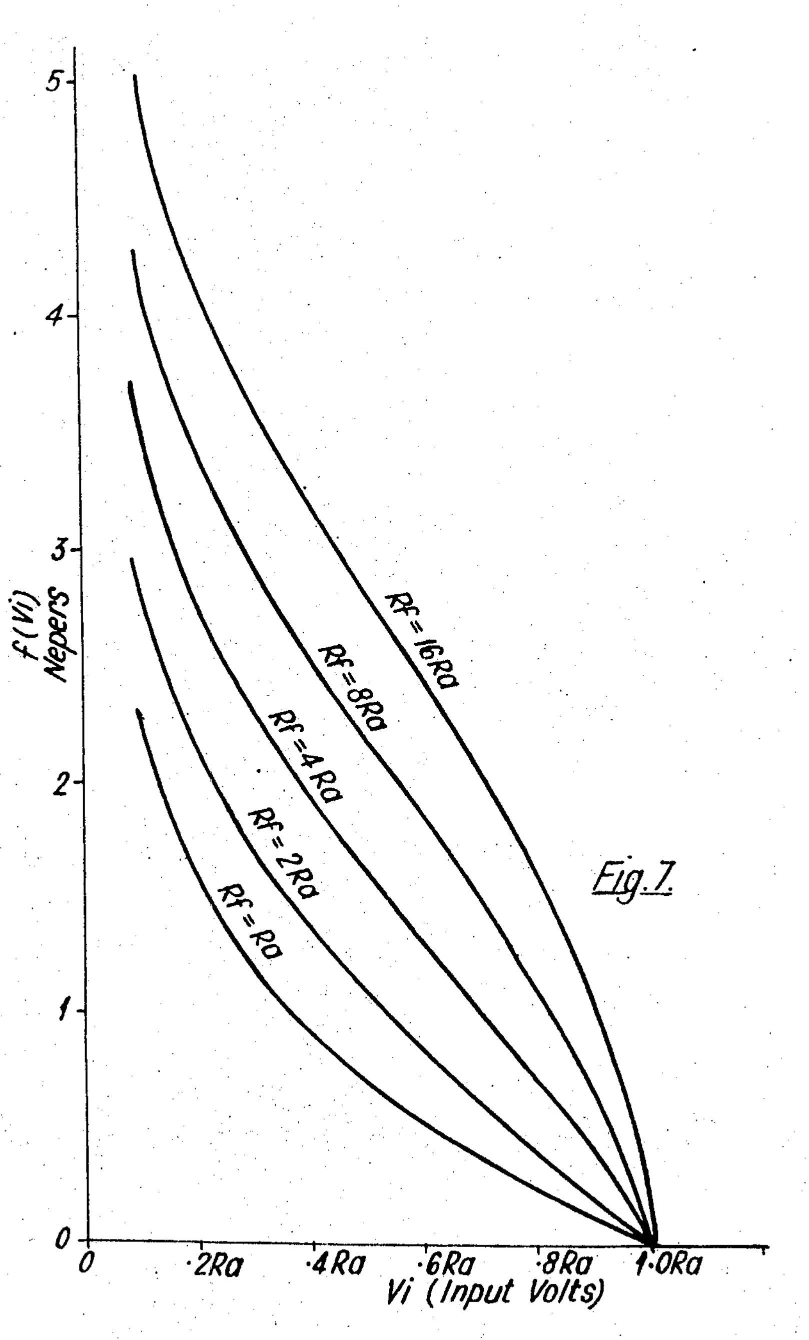

FIGURE 1 shows a block diagram form of the equipment at a terminal station for effecting automatic gain regulation in accordance with this invention, FIGURE 2 is a circuit diagram of a preferred regulating amplifier for the arrangement of FIGURE 1, FIGURE 3 is a circuit diagram of a D.C. comparator, including the gate and pulse generator, which may be used in the arrangement of FIGURE 1, FIGURE 4 is a circuit diagram of a binary bi-directional counter which may be used in the arrangement of FIGURE 1, and FIGURES 5 and 6 show some alternative networks which may be associated with the thermistor in the regulating amplifier, and FIGURE 7 shows a series of curves of gain against input voltage for the amplifier of FIGURE 2.

Referring now to FIGURE 1, signals received from the line pass through a regulating amplifier 1 and are taken from the line by means of a hybrid transformer 2. The pilot signal is recovered using a pilot filter 3 and is amplified and rectified in a pilot amplifier and rectifier 4 where A.C. components are filtered from the rectified signal thus producing a D.C. voltage proportional to pilot level. This voltage is fed into the D.C. comparator 5 where it is compared with a reference voltage from a source 10. There are two outputs from the comparator 5, namely:

(1) A D.C. voltage, the value of which is dependent on the amount of variation of the pilot level from the reference level.

(2) A D.C. voltage, the value of which is dependent on the direction of the variation of pilot level from the reference level.

The first output is used to control a gate 6 which connects a pulse generator 7 to a 6 bit 2 way binary counter 8.

The second output is connected directly to the binary counter 8 and controls the direction in which the counter 8 steps as input pulses from the generator 7 are received. The output from the counter 8 is a D.C. current which is proportional to the counter contents and which is used to control the gain of the regulating amplifier 1 in the signal path, thus regulating the signal level.

When the pilot level has varied by more than a present amount, which is usually determined by the sensitivity adjustment of the gate 6, pulses are transmitted through the gate 6 to the counter 8. The counter 8 then steps in such a direction that its change in output varies the gain of the regulating amplifier 1 to restore the signal to its correct level.

The system may be reverted to manual control by operating a changeover switch 9. This switch applies a locking voltage to the gate and thus preserves the contents of counter 8 while at the same time control of the regulating amplifier 1 is switched from the counter 8 to a manually adjusted potentiometer.

FIGURE 2 shows a preferred circuit arrangement for the regulating amplifier 1 which consists of two circuits.

Transistors T7, T8, T9 and T10 form an A.C. amplifier which is inserted in the transmission line. The gain of this amplifier is a function of the conductance of the thermistor element T.E. Transistors T1, T2, T3, T4, T5 and T6 form the thermistor control circuit which is a D.C. circuit which controls the resistance of the thermistor element T.E. and thus controls the gain of the regulating amplifier. Transistor T6 is a constant current source which feeds a D.C. current through the thermistor element T.E. in parallel with resistor R*a*. Thus the voltage on the base of transistor T3 is proportional to the resistance of resistor R*a* in parallel with the thermistor element T.E. Transistors T2, T3 and T4 form a differential amplifier. Wherever a potential different exists between the bases of T2 and T3, the collector current of transistor T5 is varied, which variation alters the temperature of the thermistor heater T.H., thus causing a variation in the resistance of the thermistor element T.E., which, in turn, causes the voltage at the base of transistor T3 to alter until the potential difference between the bases of transistors T2 and T3 vanishes. In other words transistors T2, T3 and T5 with thermistor heater T.H. and thermistor element T.E., form a servo loop. The resistance of thermistor element T.E. is a function of the input voltage on the base of transistor T2. Any variation in ambient temperature will alter the thermistor heater current, but the resistance of the thermistor element T.E. will depend solely on the input voltage at the base of transistor T2. A further advantage in using closed loop control of the thermistor is that the counter setting under normal conditions of pilot provides a more accurate indication of the gain of the system ahead of the regulating ampilfier. This, in turn, means that the end of range alarm does correspond to some definite system condition.

In the amplifier of FIG. 2, the relationship between voltage and gain is as follows:

Let $Vi$=input voltage to the base of T2.
$Rt$=resistance of thermistor element T.E.

Assume current source T6 provides unit current, and assume potential difference between bases T2 and T3 is negligible (due to high gain around servo loop) then $$Vi=\frac{RaRt}{Ra+Rt}$$

$$Rt=\frac{RaVi}{RaVi}$$

since R*t* is the gain varying component of the A.C. amplifier $$\text{Gain}=\frac{R_F+Rt}{Rt}\text{ (Approx.)}$$

$$=1-\frac{R_F}{Ra}+\frac{R_F}{Vi}$$

$$\text{Gain G (nepers)}-\ln\left(-\frac{R_F}{Ra}+\frac{R_F}{Vi}\right)$$

This above expression is shown as a series of curves of G against V*i* in the graph of FIG. 7. Each curve represents a different ratio of $R_F/Ra$.

Each curve passes through the point G=0, V*i*=1. Each curve has an inflexion point at $$Vi=\frac{R_F}{2\left(\frac{R_F}{Ra}-1\right)}$$

Note that the curve $R_F=Ra$ has inflexion at $Vi=\alpha$ and the curve $R_F=2Ra$ has inflexion at $Vi=Ra$.

The curves are symmetrical about their inflexion points. For higher ratios of $R_F/R_a$, the curves are approximately linear over the range ±1 neper from the inflexion point.

Thus over a 2 neper gain variation, the gain controlling voltage characteristic is approximately linear. That is, the counter contants is a representation of the logarithmic gain of the regulating amplifier.

FIGURE 3 illustrates a circuit which may be used for the D.C. comparator 5 and also includes the gate 6 and pulse generator 7. The pulse generator 7 is an astable multivibrator with a frequency of 1 c./s. Pulses from the generator 7 are transmitted through the gate diode 11 to the input of the first flip-flop in the counter 8. Transistors T11, T12 and T13 form a D.C. differential amplifier. The input to transistor T12 is a constant voltage used as a reference level, while the input to transistor T11 is a D.C. voltage proportional to the pilot level, obtained by means of the pilot amplifier and rectifier 4. Two diodes 12 and 13 select the more positive voltage from the collectors of transistors T11 and T12 and connect this voltage to the negative side of the gate diode 11.

The voltage at this point is most negative when the pilot level is the same as the reference level, in which case the two inputs to the differential amplifier are equal. Any variation of the pilot level, either increasing or decreasing, results in a more positive voltage being applied to the gate diode 11. The potentiometer 14 is set so that the gate diode 11 is cut off for the correct pilot level, but transmits pulses to the counter 8 when the pilot level has deviated by more than a preset amount. One or other of the transistors T14 and T15 is at all times saturated while the other is cut off, thus these transistors control the direction of the change of the counter 8. In the event of a pilot failure, or on switching to manual control, the gate diode 11 is cut off, thus preserving the counter contents.

FIG. 4 shows one circuit arrangement for the binary bidirectional counter 8 and consists of six bistable multivibrators 21, 22, 23, 24, 25, 26 connected in such a way that they may be stepped either up or down, the direction of counting being controlled by means of one of the outputs from the D.C. comparator 5. The counter 8 may be set in any one of 64 positions, but since the last two positions at either end of the range of the counter 8 trip the alarm circuits 15 (FIG. 1), only 60 positions are available for gain regulation. The output of the counter 8 is an analogue D.C. current which is directly proportional to the counter setting, being derived from resistors R1, R2, R3, R4, R5 and R6. In the event of all the multivibrators 22, 23, 24, 25 and 26 being in a 1 or an 0 state, transistor T16 or transistor T17 will saturate. This prevents the counter 8 from over-flowing, that is, from stepping from the 111111 state to the 000000 state, or vice versa, in one step.

When the transmission lines loss deviates from its normal value to such an extent that the counter 8 is stepped to position 0 or 1 at one extreme or 62 or 63 at the other, multivibrators 22 to 26 are prevented from counting any further away from normal and multivibrator 21 oscillates between the 0 and 1 setting until the line loss changes towards the normal value. Also when the counter 8 is in positions 0, 1, 62 or 63, and transistor T16 or T17 is saturated, a D.C. voltage is transmitted to alarm circuits 15 (FIG. 1) to indicate that the automatic gain regulator has reached the end of its operating range.

The counter 8 can be set in any one of three normal settings by operating one of the three pushbuttons S1, S2 or S3, which sets the automatic gain regulator to a maximum, normal or minimum gain setting respectively.

FIGS. 5 and 6 show some alternative networks that could be asssociated with the thermistor, such that the sensing voltage (or current) is approximately proportional to the logarithmic gain of the amplifier over the operating range. This is achieved in FIGURE 6 by a resistance in parallel with the thermistor element R*t* for D.C. but open circuit for A.C. when a sensing current is used. FIG. 5 illustrates a circuit which is equivalent to a resistance in series with the thermistor element R*t* for D.C., but short circuits for A.C. when a sensing voltage is used.

The same fundamental system of automatic gain control can be used for automatic compensation of variation in the characteristics of a transmission line, that is, to keep constant not only the system gain at one frequency, but also the average change in gain with respect to frequency. For compensation of the characteristics of the transmission line, two pilot signals are used, one at either end of the transmitted band. These signals are filtered, amplified and rectified, by means of filter 3 and pilot amplifier and rectifier 4, then fed into the D.C. comparator 5 with one signal taking the place of the D.C. reference voltage 10. The output of counter 8 in this case would control a variable equalizer instead of the regulating amplifier 1.

Use of more than two pilot signals allows more elaborate control of the overall frequency response.

The present invention obviously can be extended along these lines.

We claim:

1. An automatic gain regulator for a telecommunication system employing a pilot signal which is transmitted along with intelligence, said system comprising a comparator connected for receiving and comparing the amplitude of a pilot signal as received at a terminal with the amplitude of a signal at a reference level, said comparator providing a difference signal which is coupled for use in driving a digital counter to provide a counter setting and a counter output signal proportioned to the counter setting, and means for coupling the counter output signal to control the gain of a regulating amplifier coupled in series within the system, the regulating amplifier being driven in a direction to reduce the variations in overall gain.

2. An automatic gain regulator as claimed in claim 1, including means for locking the counter in the event of failure of the pilot signal.

3. An automatic gain regulator as claimed in claim 1 in which the comparator also provides a signal which controls the direction in which the counter is driven.

4. An automatic gain regulator as claimed in claim 3 in which the counter operates an alarm when it reaches either end of its counting scale.

5. An automatic gain regulator as claimed in claim 1 in which the regulating element in the regulating amplifier is a thermistor, and in which the counter output signal is compared with a voltage which is related to the thermistor resistance, the resulting difference signal being used to control the thermistor heater current.

6. An automatic gain regulator as claimed in claim 1 in which normal operating points of the counter are set by manual control of the counter.

7. An automatic gain regulator for a telecommunication system as claimed in claim 1 wherein more than one pilot signal is used to control the overall frequency response of the regulating amplifier.

8. An automatic gain regulator for a telecommunication system as claimed in claim 1 wherein the difference signal from the comparator is used to open and close a gate between a pulse generator and the digital counter.

9. An automatic gain regulator for a telecommunication system whereby variation in the characteristics of a transmission line in the system may be automatically compensated comprising input means for receiving two pilot signals, one at or near each end of a transmitted band of frequencies, a comparator coupled to said input means for comparing the amplitudes of the pilot signals and for providing a difference signal, means coupling said difference signal from the comparator to a digital counter to drive the digital counter, and means for coupling a potential proportional to the counter setting to a variable equaliser to control the variable equaliser and in turn control a regulating amplifier within the system, the counter being driven in such a direction as to reduce the variations in overall slope.

References Cited

UNITED STATES PATENTS

| | | | |
|---|---|---|---|
| 3,302,175 | 1/1967 | Deracinois | 333—16 X |
| 2,921,267 | 1/1960 | Thomas | 333—15 X |
| 2,858,529 | 10/1958 | Black | 333—15 X |
| 2,806,200 | 9/1957 | Ketchledge | 333—16 X |
| 2,626,993 | 1/1953 | Wright | 333—16 |

KATHLEEN H. CLAFFY, Primary Examiner

D. L. RAY, Assistant Examiner

U.S. Cl. X.R.

179—170.4, 170.8; 330—52